CONVERTER
Filed Feb. 15, 1966
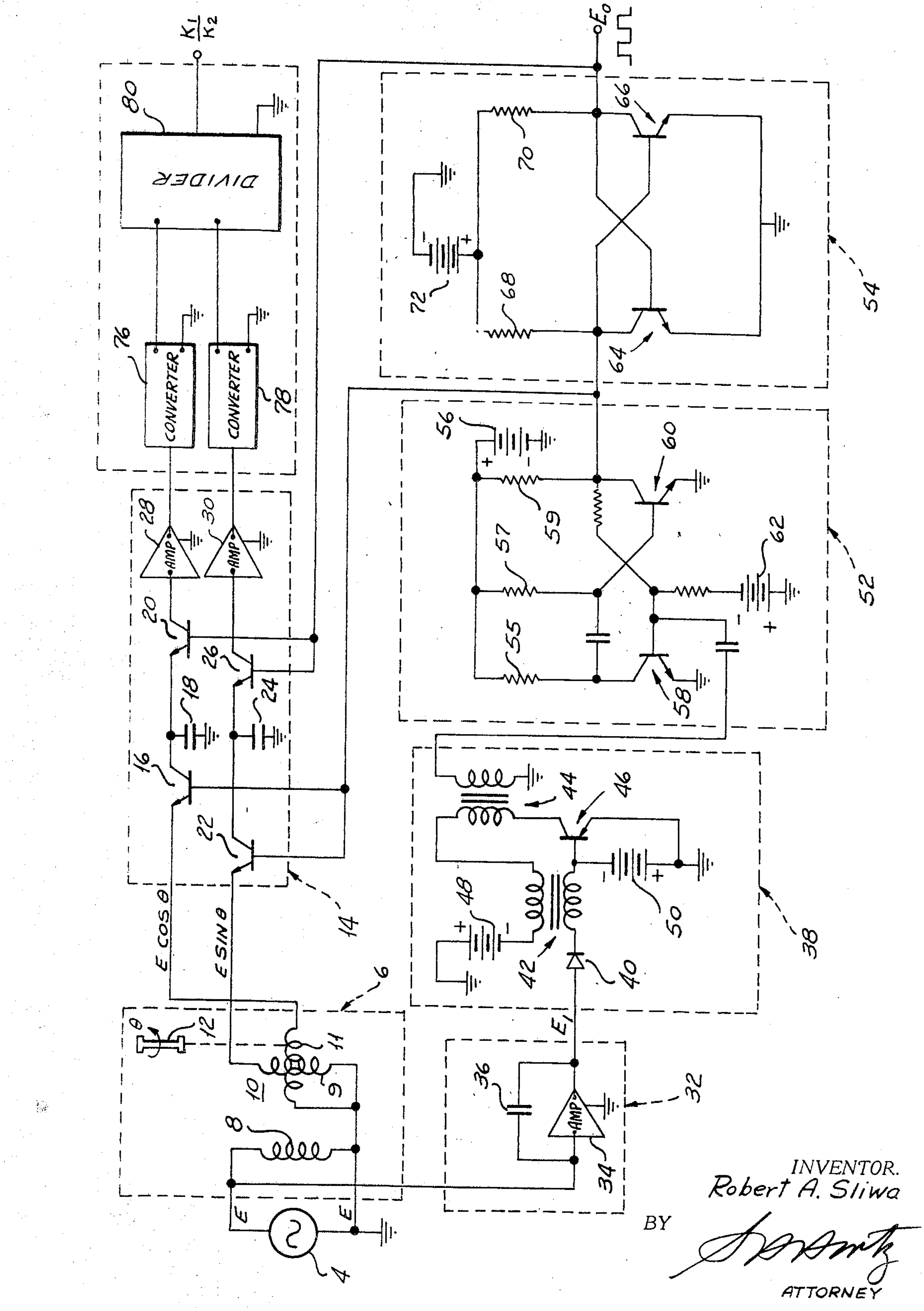
INVENTOR.
Robert A. Sliwa
BY
ATTORNEY

United States Patent Office 3,510,867
Patented May 5, 1970

3,510,867
CONVERTER

Robert A. Sliwa, Nutley, N.J., assignor to The Bendix Corporation, a corporation of Delaware Filed Feb. 15, 1966, Ser. No. 527,703
Int. Cl. H03k 13/02
U.S. Cl. 340—347 9 Claims

ABSTRACT OF THE DISCLOSURE

A converter including a signal device having an angularly displaceable element and energized by a voltage source for providing two zero crossing alternating signals varying as the sine and cosine of the angular displacement. The signals are sampled at a time other than zero crossover for providing the sine and cosine signals independent of energizing voltage irregularities.

This invention relates to converters and, in particular, to a converter for converting analog data into digital form.

One object of this invention is to provide digital data corresponding to synchro or resolver shaft position.

Another object of this invention is to provide novel means for converting synchro or resolver shaft position into digital data independent of the synchro or resolver excitation.

This invention contemplates a converter comprising a signal device for providing two substantially in-phase signals which differ in amplitude; control means for sampling the two signals and for providing pulses corresponding thereto at a predetermined time; and means connected to the control means for determining the relative amplitude of the pulses.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

The single figure shows an analog to digital converter embodying the present invention.

In reference to the figure, a signal device, shown for purposes of illustration as a resolver 6, is energized by a signal E from an alternating current source 4. Resolver 6 has an input winding 8 connected to alternating current source 4 and excited by signal E, and an output winding 10 having 2 mutually perpendicular coils 9 and 11 mounted on a shaft 12. When shaft 12 is rotated through an angle $\theta$, signals $E$ sine $\theta$ and $E$ cosine $\theta$ are induced in coils 9 and 11 of output winding 10.

Resolver 6 is connected to a sampling device 14 which includes transistors 16 and 22, transistors 20 and 26, capacitors 18 and 24 and high input impedance buffer amplifiers 28 and 30, for sampling signals $E$ sine $\theta$ and $E$ cosine $\theta$ at a predetermined time other than the zero crossing of signal E. Alternating current source 4 is connected to a phase shifting circuit 32 having an amplifier 34 and a capacitor 36 providing a signal $E_1$ leading signal E by 90 degrees.

Phase shifting circuit 32 is connected to a zero crossing detector 38 having a diode 40, transformers 42 and 44, a transistor 46 and batteries 48 and 50. When signal $E_1$ is negative, diode 40 is reverse biased providing current flow through transistor 46. As signal $E_1$ approaches zero, the reverse bias across diode 40 decreases. When signal $E_1$ is at a small critical positive value, the positive feedback provided by transformer 42 renders transistor 46 cut-off, thereby providing a sharp output pulse across the secondary winding of transformer 44.

Zero crossing detector 38 is connected to an oscillator 52 of the monostable multivibrator type such as that described at pages 199–200, Basic Theory And Applications of Transistors, TM11–690, Department of the Army, 1959, which includes transistors 58 and 60, resistors 55, 57 and 59 and batteries 56 and 62. In the quiescent state, battery 56 provides bias for rendering transistor 60 conductive and battery 62 provides bias for rendering transistor 58 cut-off. Oscillator 52 is triggered by the output of zero crossing detector 38, rendering transistor 58 conductive and transistor 60 cutoff, and remains in this state for a period of time at the end of which transistor 60 is rendered conductive and transistor 58 is rendered cutoff. Output pulses provided at the collector of transistor 60 are applied to sampling device 14 biasing transistors 16 and 22 to simultaneously sample signals $E$ cosine $\theta$ and $E$ sine $\theta$ from resolver 6 and to apply pulses corresponding to the sampled signals to transistors 20 and 26 through capacitors 18 and 24, respectively.

Oscillator 52 is connected to an oscillator 54 which is of the bistable multivibrator type such as that described at pages 204–205, Basic Theory And Applications Of Transistors, supra, which includes transistors 64 and 66, resistors 68 and 70 and a battery 72. Oscillator 54 is set by the output of oscillator 52 to one of its stable states rendering transistor 64 conductive, and triggered by reset pulses $E_0$, to its other stable state in accordance with a predetermined timing program to render transistor 66 conductive. Battery 72 biases transistors 64 and 66 so that when one of the transistors is conductive the other is cut-off. Output pulses provided at the collector of transistor 64 are applied to sampling device 14 biasing transistors 20 and 26 to simultaneously apply the pulses corresponding to sampled signals $E$ cosine $\theta$ and $E$ sine $\theta$ to amplifiers 28 and 30, respectively, thereby providing pulses at the outputs of sampling device 14 corresponding in amplitude to the analog signals $E$ sine $\theta$ and $E$ cosine $\theta$ provided by resolver 6.

The pulses from sampling device 14 are applied to converters 76 and 78 of an encoder 72 which provides digital numbers corresponding to the amplitude of signals $E$ sine $\theta$ and $E$ cosine $\theta$, respectively, as follows:

$$E \text{ sine } \theta = K_1$$

$$E \text{ cosine } \theta = K_2$$

Digital numbers $K_1$ and $K_2$ are applied to a divider 80 included in encoder 72 which determines the ratio $K_1/K_2$ to provide the tangent of angle $\theta$.

The arc tangent $K_1/K_2$ provides a digital representation of angle $\theta$.

Divider 80 is a digital divider of the type well known in the art, such as that shown in FIGS. 6–8 at page 50 of Automatic Digital Calculators, Booth and Booth, Butterworths Scientific Publications, London, 1956. Another divider which serves the purpose of the invention is shown in FIGS. 12–16 at page 443 of Digital Computer Design Fundamentals, Chu, McGraw Hill, New York, 1962.

Resolver 6 provides two substantially in-phase signals which differ in amplitude as a function of the sine and cosine of angle $\theta$ of resolver shaft 12. Phase shifting device 32 provides an output shifted 90° in phase from the signals provided by resolver 6 and zero crossing detector 38 provides a pulse when the output of phase shifting device 32 crosses zero. The pulse provided by zero crossing detector 38 triggers oscillator 52 which sets oscillator 54 in one of its stable states.

Oscillators 52 and 54 control sampling device 14 for simultaneously sampling signals $E$ sine $\theta$ and $E$ cosine $\theta$ provided by resolver 6 at a predetermined time providing digital data corresponding to angle $\theta$ of resolver shaft 12. The system is reset for another data conversion when oscillator 54 is triggered to its other stable state by pulses $E_0$.

It is to be understood that the timing of pulse $E_0$ is independent of the sampling time and is not critical. However, it is preferred that the timing be such that resetting occurs at the end of the negative half cycle of voltage E from source 4.

Since signals $E$ sine $\theta$ and $E$ cosine $\theta$ provided by resolver 6 are simmultaneously sampled by sampling device 14 at a time other than the zero crossing of excitation signal E, the effects of excitation signal E, including amplitude, frequency and harmonic content are negated. The device embodied in the present invention thus provides novel means for providing digital data corresponding to the angle of resolver shaft 12 independent of excitation signal E.

Although but a single embodiment of the invention has been illustrated and described in detail, it is to be expressly understood that the invention is not limited thereto. For example, the signal source included in the invention has been described with reference to a resolver, but is adaptable as well to a synchro for providing shaft position signals. Various changes may also be made in the design and arrangement of the parts without departing from the spirit and scope of the invention as the same will now be understood by those skilled in the art.

What is claimed is:

1. An analog to digital converter, comprising:
- a signal device connected to a source of zero crossing alternating voltage subject to voltage irregularities and energized thereby and having an angularly displaceable element, and providing two alternating signals varying in amplitude as a function of the sine and cosine of the angular displacement;
- control means connected to the alternating voltage source and to the signal device for sampling the sine and cosine signals after the alternating voltage crosses zero and for providing pulses varying in amplitude with the sampled signals;
- means connected to the control means for providing digital outputs corresponding to the amplitude of the pulses; and
- means connected to the digital output means and responsive to the digital outputs therefrom for providing a signal which is a digital representation of the angular displacement, with said signal being free of irregularities in the voltage from the alternating voltage source.

2. A converter as described by claim 1, wherein the means connected to the digital output means and responsive to the digital outputs therefrom for providing a signal which is a digital representation of the angular displacement includes:
- means for dividing said digital outputs to provide a digital signal corresponding to the tangent of the angular displacement.

3. A converter as described by claim 1, wherein the control means comprises:
- means connected to the alternating voltage source for providing a first pulse after zero crossover of the voltage therefrom;
- means connected to said means and responsive to the first pulse therefrom for providing second and third pulses; and
- means connected to the signal device and to the last mentioned means for sampling the signals from the signal device in response to the second pulse, and for providing the pulses varying in amplitude with the sampled signals in response to the third pulse.

4. A converter as described by claim 3 wherein the means for providing the first pulse comprises:
- a phase shifting device connected to the alternating voltage source and responsive to the voltage therefrom for providing a phase shifted signal; and
- means connected to the phase shifting device for detecting zero crossover of the phase shifted signal and for providing the first pulse at zero crossover.

5. A converter as described by claim 3 wherein the means for providing the second and third pulses comprises:
- a first oscillator connected to the means for providing the first pulse and rendered effective by the first pulse for providing the second pulse; and
- a second oscillator connected to the first oscillator and rendered effective by the second pulse for providing the third pulse.

6. A converter as described by claim 5, including:
- means connected to the second oscillator for providing pulses at a predetermined frequency for resetting said second oscillator.

7. A converter as described by claim 5 wherein the means for sampling the signals comprises:
- a first transistor having base, emitter and collector elements being connected at the base element to the first oscillator and at the emitter element to the signal device for sampling one of the signals provided by the signal device in response to the second pulse; and
- a second transistor having base, emitter and collector elements being connected at the base element to the first oscillator and at the emitter element to the signal device for sampling the other of the signals provided by the signal device in response to the second pulse.

8. A converter as defined by claim 7 including:
- a third transistor having base, emitter and collector elements being connected at its emitter element to the collector element of the first transistor and at its base element to the second oscillator, and responsive to the third pulse for providing at its collector element a pulse corresponding to the signal sampled by the first transistor; and
- a fourth transistor having base, emitter and collector elements being connected at its emitter element to the collector element of the third transistor and at its base element to the second oscillator, and responsive to the third pulse for providing at its collector element a pulse corresponding to the signal sampled by the second transistor.

9. A converter as described by claim 8 comprising:
- a first capacitor for coupling the collector element of the first transistor to the emitter element of the second transistor; and
- a second capacitor for coupling the collector element of the third transistor to the emitter element of the fourth transistor.

References Cited

UNITED STATES PATENTS

| | | | |
|---|---|---|---|
| 3,059,228 | 10/1962 | Beck et al. | 340—179 |
| 2,894,256 | 7/1959 | Kronacher | 340—347 |
| 3,025,511 | 3/1962 | Orrange | 340—347 |
| 3,250,904 | 5/1966 | Vasu et al. | 235—186 |

DARYL W. COOK, Primary Examiner

G. R. EDWARDS, Assistant Examiner